(12) United States Patent
Wu

(10) Patent No.: US 8,731,511 B2
(45) Date of Patent: May 20, 2014

(54) METHOD AND RELATED COMMUNICATION DEVICE FOR TRANSMISSION AND RECEPTION OF NATURAL DISASTER WARNING NOTIFICATION MESSAGE IN A WIRELESS COMMUNICATION SYSTEM

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 716 days.

(21) Appl. No.: 12/264,270

(22) Filed: Nov. 4, 2008

(65) Prior Publication Data

US 2010/0075625 A1    Mar. 25, 2010

Related U.S. Application Data

(60) Provisional application No. 61/098,793, filed on Sep. 21, 2008.

(51) Int. Cl.
*H04M 11/04* (2006.01)
*H04W 4/22* (2009.01)
*H04W 4/00* (2009.01)
*H04W 4/06* (2009.01)
*H04M 1/725* (2006.01)
*H04H 20/59* (2008.01)

(52) U.S. Cl.
CPC . *H04W 4/22* (2013.01); *H04W 4/00* (2013.01); *H04W 4/06* (2013.01); *H04M 1/72536* (2013.01); *H04H 20/59* (2013.01)
USPC ............ 455/404.1; 455/466; 455/414.1; 370/312; 370/270; 340/539.11; 340/517

(58) Field of Classification Search
CPC ............ H04W 4/22; H04W 4/00; H04W 4/06; H04M 1/72536; H04H 20/59
USPC ............ 455/404.1, 414.1, 404.2, 343.1, 466, 455/458; 370/312, 310, 328, 270; 379/67.1, 379/88.23, 88.12, 88.18, 87; 711/162, 711/E12.103; 340/539.1, 517, 539.11, 340/573.1
See application file for complete search history.

(56) References Cited

U.S. PATENT DOCUMENTS

| 7,054,612 | B2* | 5/2006 | Patel ........................... 455/404.1 |
| 2006/0040639 | A1* | 2/2006 | Karl et al. .................. 455/404.1 |
| 2007/0204291 | A1* | 8/2007 | Ichihashi ....................... 725/33 |
| 2008/0194224 | A1 | 8/2008 | Thorson |

(Continued)

FOREIGN PATENT DOCUMENTS

| EP | 1553798 A1 | 7/2005 |
| KR | 1020070061132 A | 6/2007 |

OTHER PUBLICATIONS

3GPP, 3GPP TSG RAN WG2 #63 R2-084873, "Control-Plane Session Report", Aug. 22, 2008.

(Continued)

*Primary Examiner* — Mahendra Patel
(74) *Attorney, Agent, or Firm* — Winston Hsu; Scott Margo

(57) ABSTRACT

A method of handling notification message transmission corresponding to a message content change for a network of a wireless natural disaster warning communication system includes modifying content of transmission information corresponding to the notification message transmission when content of a notification message is changed.

23 Claims, 12 Drawing Sheets

(56) References Cited

U.S. PATENT DOCUMENTS

| | | | |
|---|---|---|---|
| 2008/0216113 A1* | 9/2008 | Yun et al. | 725/33 |
| 2009/0080354 A1 | 3/2009 | Shin | |
| 2009/0239554 A1* | 9/2009 | Sammour et al. | 455/458 |
| 2010/0026472 A1* | 2/2010 | Kitazoe | 340/311.2 |
| 2011/0105075 A1* | 5/2011 | Lee et al. | 455/404.1 |

OTHER PUBLICATIONS

3GPP, 3GPP TSG RAN WG2 #63 R2-084890,"Text proposal capturing agreements on ETWS", Aug. 2008.

3GPP, 3GPP TSG-RAN WG2 #63 R2-084289,"Considerations on Reception of ETWS Notification", Aug. 2008.

Office action mailed on Jun. 30, 2011 for the European application No. 09010416.7, filing date Aug. 12, 2009, p. 1-4.

3GPP TS 36.331 CR0005 (Release 8), "Miscellaneous Corrections and Clarifications", 3GPP TSG-RAN2 #63 meeting, R2-084791 (Aug. 2008), p. 18, 30, 119.

Office action mailed on Jun. 24, 2013 for the Taiwan application No. 098130676, filed Sep. 11, 2009, p. 1-6.

* cited by examiner

METHOD AND RELATED COMMUNICATION DEVICE FOR TRANSMISSION AND RECEPTION OF NATURAL DISASTER WARNING NOTIFICATION MESSAGE IN A WIRELESS COMMUNICATION SYSTEM

CROSS REFERENCE TO RELATED APPLICATIONS

This application claims the benefit of U.S. Provisional Application No. 61/098,793, filed on Sep. 21, 2008 and entitled "METHOD AND RELATED COMMUNICATION DEVICE FOR ETWS TRANSMISSION AND RECEPTION IN A WIRELESS COMMUNICATION SYSTEM" the contents of which are incorporated herein.

BACKGROUND OF THE INVENTION

1. Field of the Invention

The present invention relates to a method and device utilized in a wireless communication system, and more particularly, to a method and communication device for notification message transmission and reception of a natural disaster warning of the wireless communication system.

2. Description of the Prior Art

Earthquake and Tsunami Warning System (ETWS), set forth by the 3rd Generation Partnership Project (3GPP), introduces a means to deliver Warning Notification simultaneously to many mobile users who should evacuate from approaching Earthquake or Tsunami. The ETWS consists of a PLMN (Public Land Mobile Network) that is capable to deliver Warning Notification and user equipments (UEs) that are capable to receive Warning Notification. The PLMN of the ETWS can be a GERAN (GSM/EDEG radio access network) of a 2 G/2.5 G GSM system, a UTRAN (UMTS radio access network) of a 3 G UMTS system, or a EUTRAN (evolved-UTAN) of a long term evolution (LTE) system. Warning Notification Providers, which are usually run by local governments, produce Warning Notification to PLMN operator when an earthquake or tsunami event occurs.

Warning Notification is classified into two types depending on the purpose and urgency of the notification. The first type of Notification is called Primary Notification that delivers the most important information of the threat that is approaching to users (e.g. the imminent occurrence of Earthquake or Tsunami) and shall be delivered to the users as soon as possible. For example, the Primary Notification can notify the UE of the disaster type. The second type of Notification is called Secondary Notification that delivers additional information, such as instructions on what to do or where to get help.

The Warning Notification Provider publishes a Primary Notification to PLMN and specifies the Notification Area where the Warning Notification is expected to be distributed when occurrence of a natural disaster is detected. Single or multiple Secondary Notifications are published following the Primary Notification. Finally, the Warning Notification Provider may request dissemination of notification to the PLMN to stop.

According to the related specifications so far, a primary notification message corresponding to the Primary Notification and a secondary notification message corresponding to the Secondary Notification are both provided by system information that is seen as broadcast information and transmitted on a BCCH (Broadcast Control Channel). The primary notification message is contained in a SIB10 (System Information Block Type 10), whereas the secondary notification message is contained in a SIB11 or multiple SIB11s.

The primary notification can occur at any point in time. A paging message is used for informing the UEs about presence of the primary notification. If the UE receives the paging message including "etws-PrimaryNotificationindication", the UE knows that the ETWS primary notification is present.

"etws-PrimaryNotificationindication" is a value represented by one bit and included in the paging message to indicate "ETWS primary notification present". When receiving this bit of the paging message, the UE immediately reads a SIB1 to find scheduling information for the SIB10 and read the SIB10 including the primary notification message.

The secondary notification message is allowed to be segmented, and the segments are transmitted via multiple SIB11s. Transmission cycles through the different segments belonging to a single secondary notification message at subsequent occasions for this SIB.

The PLMN possibly publishes several secondary notification messages with different content. Each of the secondary notification messages can be transmitted segment by segment via the SIB11. However, the above-mentioned specifications do not specify any actions of the UE about how to know which secondary notification message each segment belongs to. When the UE does not identify which secondary notification message a received segment belongs to, the segments corresponding to different secondary notification messages may be combined together. In this situation, a decoding result of the complete secondary notification message turns out unreadable text content. Consequently, the user is not able to follow indication of the secondary notification message.

According to the abovementioned specifications, the UE receives the primary notification message after the paging message including the "etws-PrimaryNotificationindication" is received. Then the UE receives the secondary notification message after a primary notification message is received. However, the secondary notification messages may be arrived at the UE before the primary notification message due to system information scheduling. In this situation, the UE is unable to receive the secondary notification message since the primary notification message has not been received. To achieve an emergent disaster notification system, the primary and secondary notification messages should be received as soon as possible.

SUMMARY OF THE INVENTION

The present invention therefore provides a method and related communication device for a notification message reception and transmission corresponding to message content change and message targets for a natural disaster warning system of a wireless communication system that can avoid incorrect decoded message content and can enhance notification efficiency.

According to an embodiment of the present invention, a method of handling notification message transmission corresponding to a message content change for a network of a wireless natural disaster warning communication system is disclosed. The method includes modifying content of transmission information corresponding to the notification message transmission when content of a notification message is changed.

According to an embodiment of the present invention, a method of handling notification message reception corresponding to a message content change for a UE of a wireless natural disaster warning communication system is further disclosed. The method includes receiving transmission information corresponding to the notification message transmission, and then clearing data corresponding to the notification message in a buffer of the user equipment according to content of the received transmission information.

According to an embodiment of the present invention, a method of handling notification message transmission corresponding to a message content change for a network of a wireless natural disaster warning communication system is further disclosed. The method includes including a message identity in a SIB comprising content of a notification message.

According to an embodiment of the present invention, a method of handling notification message reception corresponding to a message content change for a user equipment of a wireless natural disaster warning communication system is further disclosed. The method includes receiving at least a system information block, hereinafter called SIB, comprising content of the notification message and a message identity, and then generating the notification message with the content of the at least a received SIB according to the corresponding message identity.

According to an embodiment of the present invention, a method of handling notification message transmission for a network of a wireless natural disaster warning communication system is further disclosed. The method includes modifying scheduling information corresponding to a primary or secondary notification message, and then transmitting the scheduling information before a paging message indicating existence of the primary notification message.

According to an embodiment of the present invention, a method of handling notification message reception for a user equipment of a wireless natural disaster warning communication system is further disclosed. The method includes, when a paging message indicating existence of a primary notification message is received, starting to acquire both the primary notification message and a secondary notification message according to scheduling information.

According to an embodiment of the present invention, a method of handling notification message reception for a user equipment of a wireless natural disaster warning communication system is further disclosed. The method includes acquiring a secondary notification message when a paging message indicating existence of a primary or secondary notification message is received at a modification period, and then stopping acquiring the secondary notification message at an ending boundary of the modification period when no scheduling information for the secondary notification message is received during the modification period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
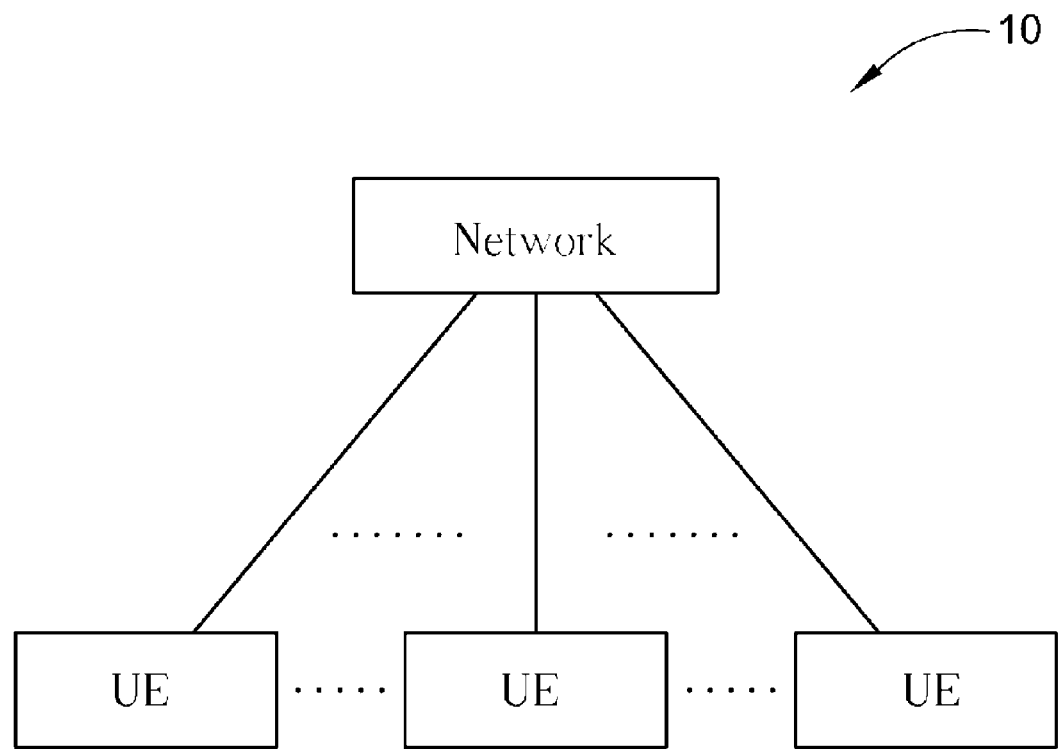
FIG. 1 is a schematic diagram of a wireless communication system.

Please refer to FIG. 1, which illustrates a schematic diagram of a wireless communication system 10 according to an embodiment of the present invention. The wireless communication system 10 is an Earthquake and Tsunami Warning System based on a 2.5 G/3 G mobile telecommunication system, an LTE (long-term evolution) system or other mobile communication systems, and is briefly composed of a network and a plurality of UEs. In FIG. 1, the network and the UEs are simply utilized for illustrating the structure of the wireless communication system 10. Practically, the network may be a public land mobile network (PLMN), such as a GERAN (GSM/EDEG radio access network) of a 2 G/2.5 G GSM system, a UTRAN (UMTS radio access network) of a 3 G UMTS system, or a EUTRAN (evolved-UTAN) of the LTE system, comprising a plurality of base stations (i.e. BTSs, Node-Bs, or eNBs), network controllers (i.e. Base Station Controllers or Radio Network Controllers) and so on according to actual demands. The UEs can be devices such as mobile phones, computer systems, etc. Besides, the network and the UE can be seen as a transmitter or receiver according to transmission direction, e.g., for uplink, the UE is the transmitter and the network is the receiver, and for downlink, the network is the transmitter and the UE is the receiver.

Figure 2:
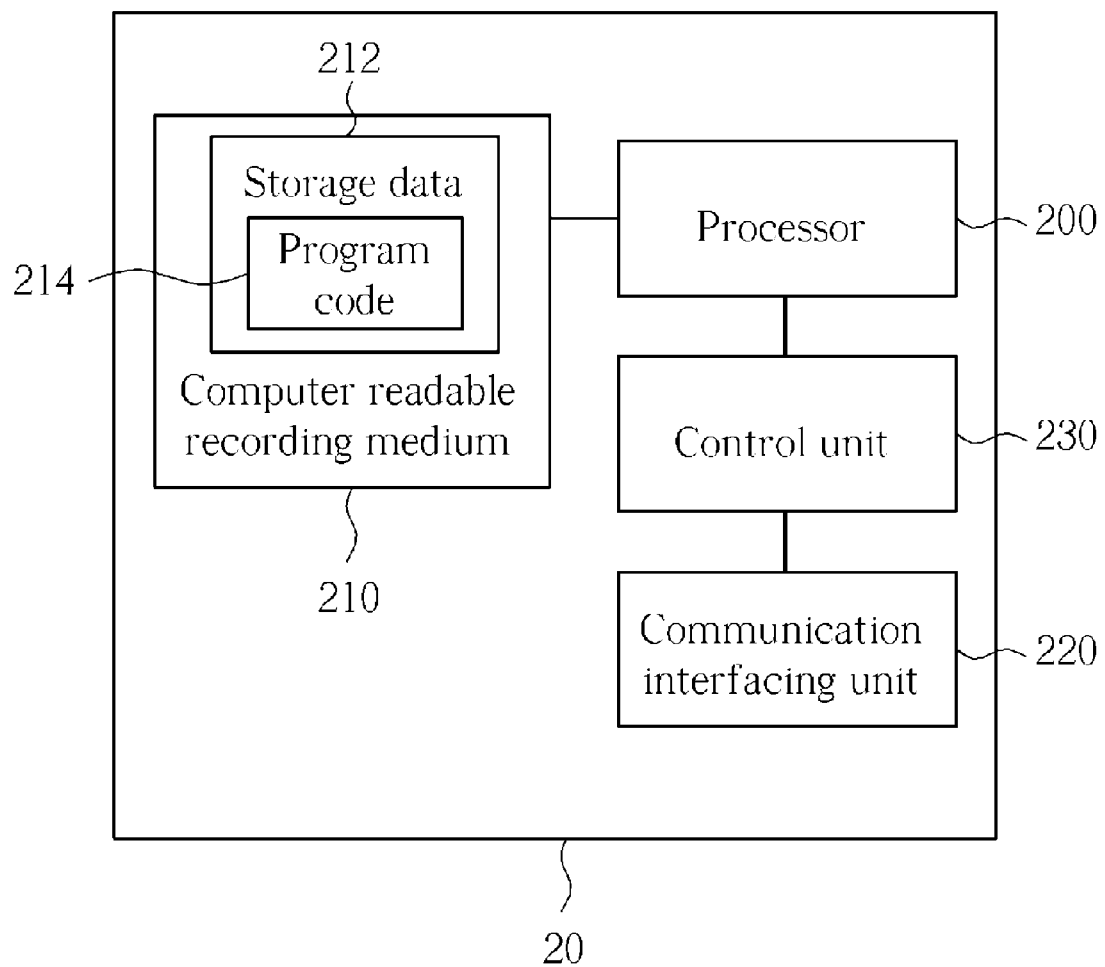
FIG. 2 is a schematic diagram of a communication device according to embodiments of the present invention.

Please refer to FIG. 2, which illustrates a schematic diagram of a communication device 20 according to embodiments of the present invention. The communication device 20 is utilized for realizing the network or the UEs shown in FIG. 1 and includes a processor 200, a computer readable recording medium 210, a communication interfacing unit 220 and a control unit 230. The computer readable recording medium 210 is any data storage device that stores storage data 212, including program code 214 of a process and corresponding parameters (i.e. a timer or a flag if necessary). The storage data 212 and the process thereof are thereafter read and processed by the processor 200 to generate processing results. Examples of the computer readable recording medium include read-only memory (ROM), random-access memory (RAM), CD-ROMs, magnetic tapes, floppy disks, optical data storage devices, and carrier waves (such as data transmission through the Internet). The control unit 230 controls the communication interfacing unit 220 and related operations and states of the communication device 20 according to the processing results of the process 200. The communication interfacing unit 220 is responsible for exchanging wireless signals with a peer communication device.

When a natural disaster (i.e. an earthquake or a tsunami) occurs, the network of the wireless communication system 10 receives one or more Primary Notifications and one or more following Secondary Notifications published by a Warning Notification Provider and thereby sends Primary Notification messages and the Secondary Notification messages to the UE via system information block types 10 and 11 (SIB10 and SIB11). Through a BCCH (Broadcast Control Channel), the UE reads an SIB1 for scheduling information of the primary or secondary notification message. In addition, the primary or secondary notification message can be transmitted with multiple segments.

When the warning notification provider attempts to publish multiple primary and secondary notification messages with different content, the following processes 30 and 50 are provided for the network to modify content of transmission information corresponding to the notification message transmission when content of the notification message is changed. Accordingly, the following processes 40 and 60 are provided for the UE to clear data corresponding to the notification message in a buffer according to content of the received transmission information.

Figure 3:
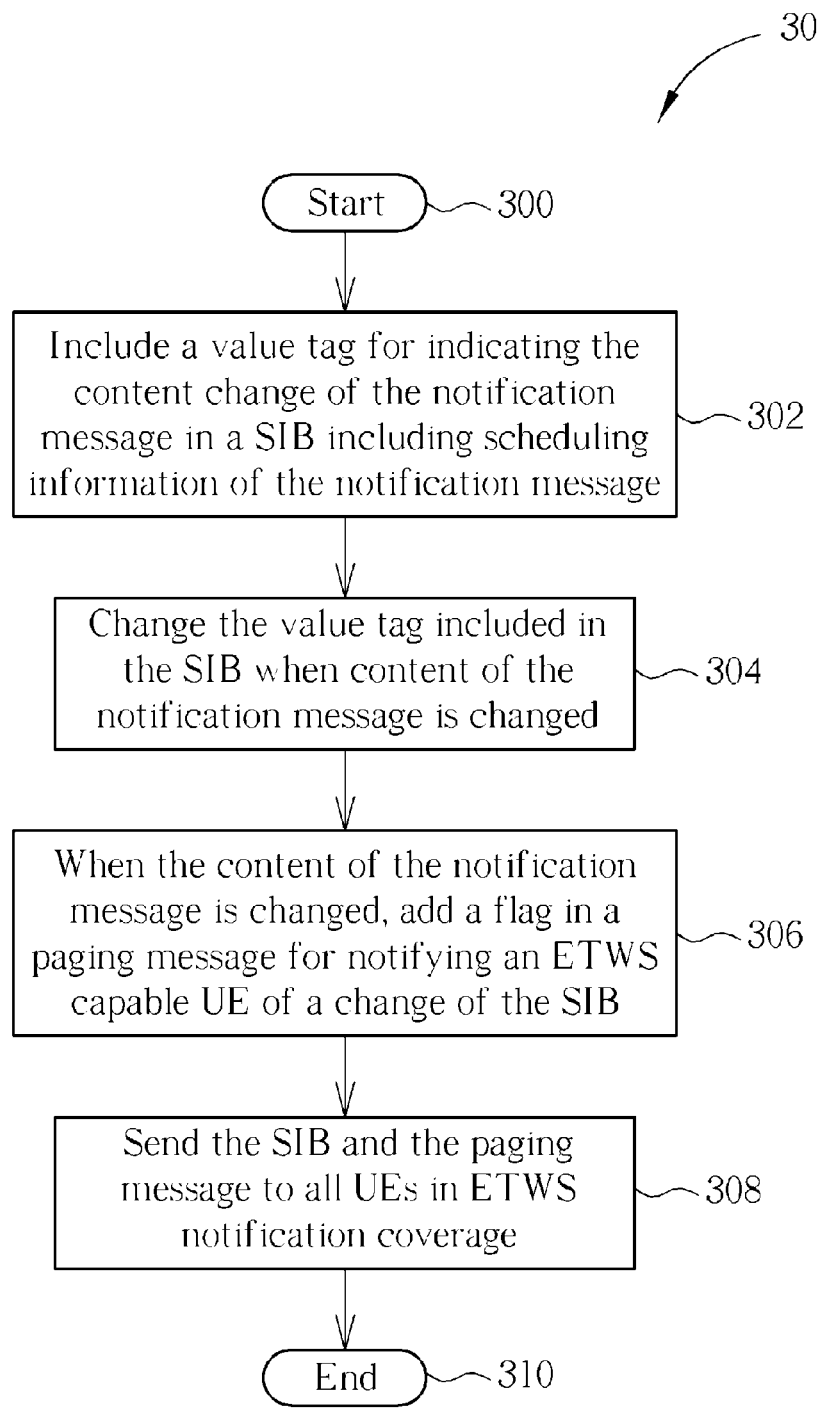
FIGS. 3-12 are flowcharts of processes according to embodiments of the present invention.

Please refer to FIG. 3, which illustrates a flowchart of a process 30 according to an embodiment of the present invention. The process 30 is utilized for handling a content change of a notification message corresponding to ETWS for a network of a wireless communication system and can be compiled into the program code 214 of the process in the storage data 212. The process 30 includes the following steps:

Step 300: Start.

Step 302: Include a value tag for indicating the content change of the notification message in a SIB including scheduling information of the notification message.

Step 304: Change the value tag included in the SIB when content of the notification message is changed.

Step 306: When the content of the notification message is changed, add a flag in a paging message for notifying an ETWS capable UE of a change of the SIB.

Step 308: Send the SIB and the paging message to all UEs in ETWS notification coverage.

Step 310: End.

According to the process 30, a value tag for indicating the content change of the notification message is included in the SIB including the scheduling information. When the content of the notification message is changed, the network changes a value tag to notify the UE of the content change. Preferably, the network increments the value tag. Meanwhile, the network further adds a flag in a paging message for notifying the UE of the SIB change. Finally, the network sends the SIB and the paging message to the UEs by means of broadcasting and paging respectively.

The notification message is the primary or the secondary notification message. In this situation, the SIB including the scheduling information is the SIB1. When the SIB1 is employed in the process 30, the network can use a joint or separate value tags for indicating the content change of the primary and secondary notification messages.

The value tag is preferably dedicated for SIB11, SIB10 or both of the SIB11 and SIB10. When the value tag is dedicated for either SIB11 or SIB10, this means that separates value tags are used for the primary or the secondary notification messages respectively. When the value tag is dedicated for both of the SIB11 and SIB10, this means that a joint value tag is used for the primary or the secondary notification messages.

Alternatively, the value tag is used for notifying the UEs of changes of any SIBs other than SIB1, such as SIB5, SIB6, SIB10 or SIB11. In other words, the value tag is not the value tag for indicating changes of any SIBs.

Figure 4:
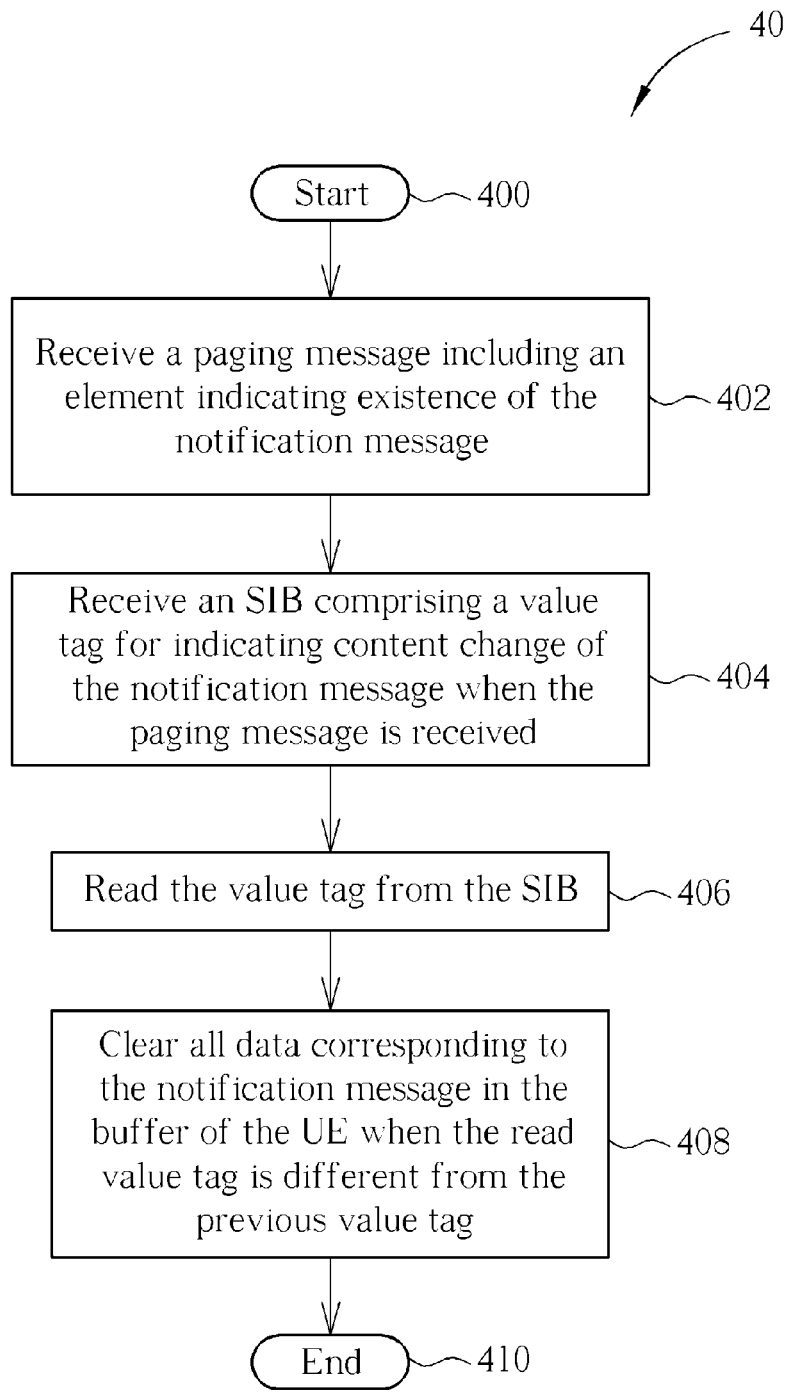

To cooperate with the network adopting the process 30, the following processes are provided for the UE to be aware of the content change. Please refer to FIG. 4, which illustrates a flowchart of a process 40 according to an embodiment of the present invention. The process 40 is utilized for handling a content change of a notification message corresponding to ETWS for an ETWS capable UE of a wireless communication system and can be compiled into the program code 214 of the process in the storage data 212. The ETWS capable UE keeps receiving the notification message and stores related data into a buffer. The process 40 includes the following steps:

Step 400: Start.

Step 402: Receive a paging message including an element indicating existence of the notification message.

Step 404: Receive an SIB comprising a value tag for indicating content change of the notification message when the paging message is received.

Step 406: Read the value tag from the SIB.

Step 408: Clear all data corresponding to the notification message in the buffer of the UE when the read value tag is different from the previous value tag.

Step 410: End.

According to the process 40, the ETWS capable UE receives the paging message including the element and thereby turns to receive the SIB. The UE is aware of the SIB change by receiving the value tag. After the SIB is received, the ETWS capable UE reads the value tag from the SIB and clears all data corresponding to the notification message in the buffer when the read value tag is different from the previously read value tag.

Preferably, the notification message is the primary or the secondary notification message. The element is an "etws-PrimaryNotificationindication" element. The SIB is an SIB10 including the primary notification message or an SIB11 including the secondary notification message. Alternatively, the SIB is the SIB1 including the scheduling information. When the network uses a joint value tag, the UE clears all data corresponding to both of the primary and secondary notification messages in the buffer. When the network uses separate value tags, the UE clears all data corresponding to the primary or the secondary notification message in the buffer depended on the read value tag. When a dedicated value tag is used, the ETWS capable UEs turn to receive the SIB11 or SIB10 because of the SIB change, whereas ETWS non capable UEs ignore the SIB change.

As can been from the above, for ETWS, the embodiments of the present invention provides (1) when the content in the secondary notification message is changed, the value tag in SIB1 is changed, (2) when the content in the primary notification message is changed, the value tag in SIB1 is changed, and (3) a separate value tag can be used defined for SIB10, for SIB11, or for SIB10 and SIB11.

Please note that those skilled in the art can use other parameters to realize the processes 30 and 40. For example, a message ID included in the SIB11 can be used.

Figure 5:
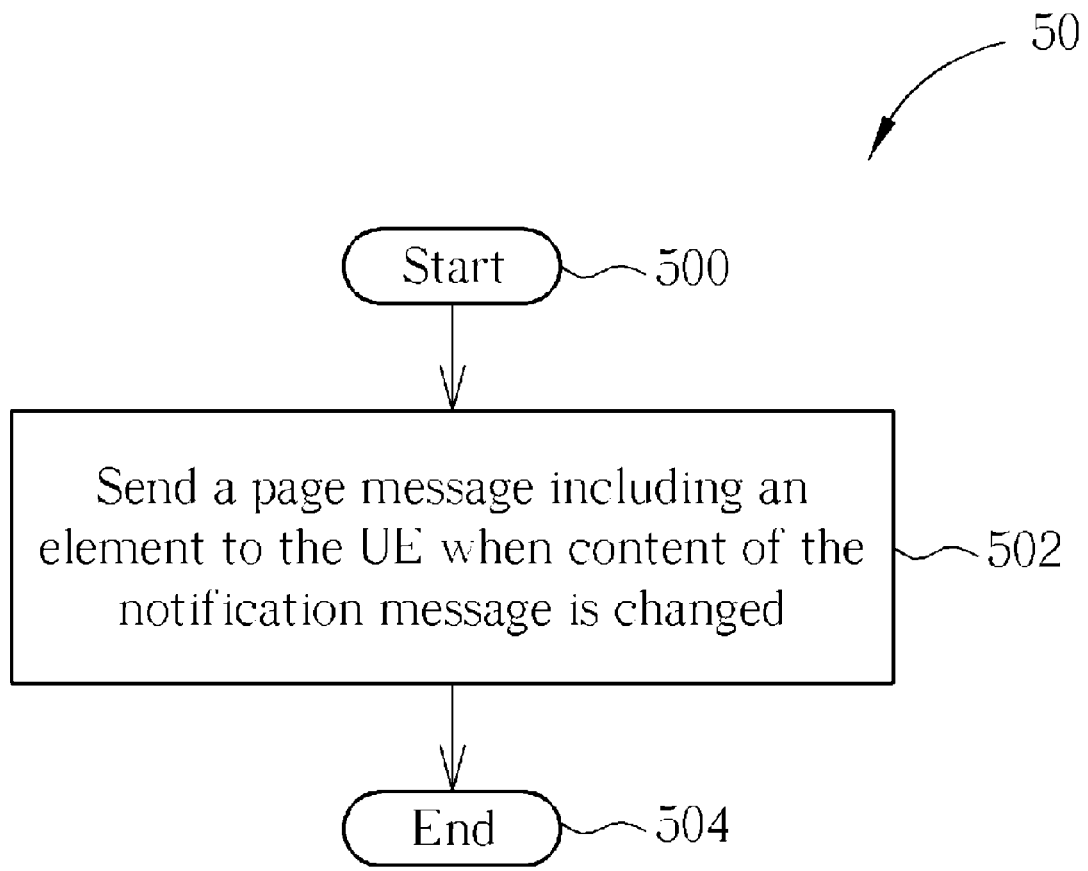
Figure 6:
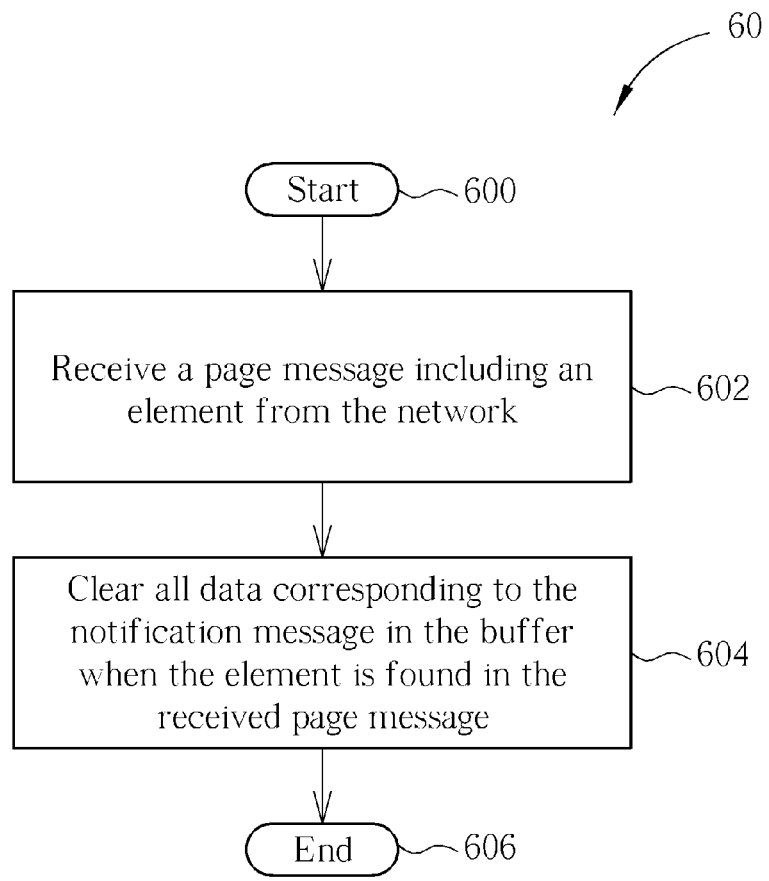

When the SIB1 includes no value tag for SIB10 or SIB11, the following processes are provided for awareness of the content change of the notification message. Please refer to FIGS. 5 and 6, which illustrate flowcharts of processes 50 and 60 according to an embodiment of the present invention. The processes 50 and 60 are utilized for handling a content change of a notification message corresponding to ETWS for a network and an ETWS capable UE of a wireless communication system, respectively. The ETWS capable UE stores related data related to the notification message in a buffer. The processes 50 and 60 can be compiled into the program code 214 of the process in the storage data 212. The process 50 includes the following steps:

Step 500: Start.

Step 502: Send a page message including an element to the UE when content of the notification message is changed.

Step 504: End.

According to the process 50, the network sends a page message including an element to the UE when the content of the notification message is changed.

In addition, the process 60 includes the following steps:

Step 600: Start.

Step 602: Receive a page message including an element from the network.

Step 604: Clear all data corresponding to the notification message in the buffer when the element is found in the received page message.

Step 606: End.

According to the process 60, when the element is found in the received page message, the UE is aware of the content change and then clears all the data related to the old content of the notification message in the buffer. After buffer clearing, the UE turns to receive the notification message with new content.

When the notification message is secondary notification message, the element is a secondary notification change indicator or "etws-PrimaryNotificationindication" for notifying the UE of the content change. When the notification message is primary notification message, the element is "etws-PrimaryNotificationindication".

As can be seen from the processes 50 and 60, the embodiment of the present invention provides ETWS with (1) a paging message is sent to notify a UE of a content change of the primary notification message when no value tag in the SIB1 is used for changes of the SIB 10, and (2) a paging message is sent to notify a UE of a content change of the secondary notification message when no value tag in the SIB1 is used for changes of the SIB 11.

Figure 7:
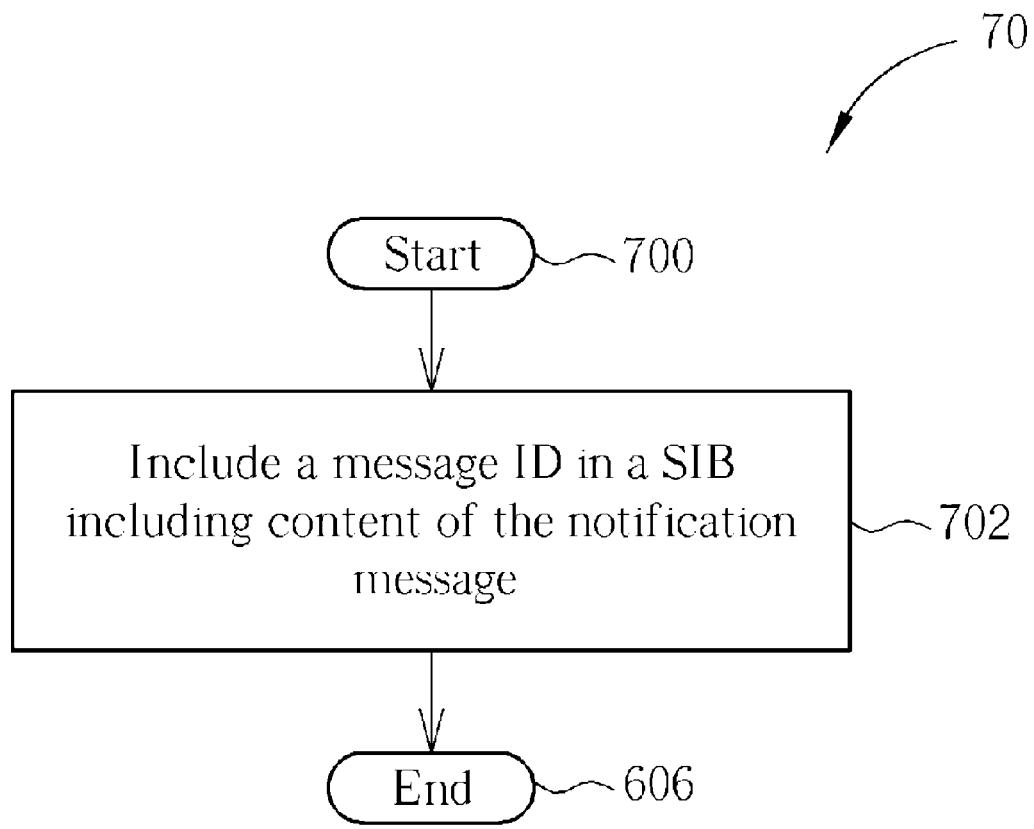
Figure 8:
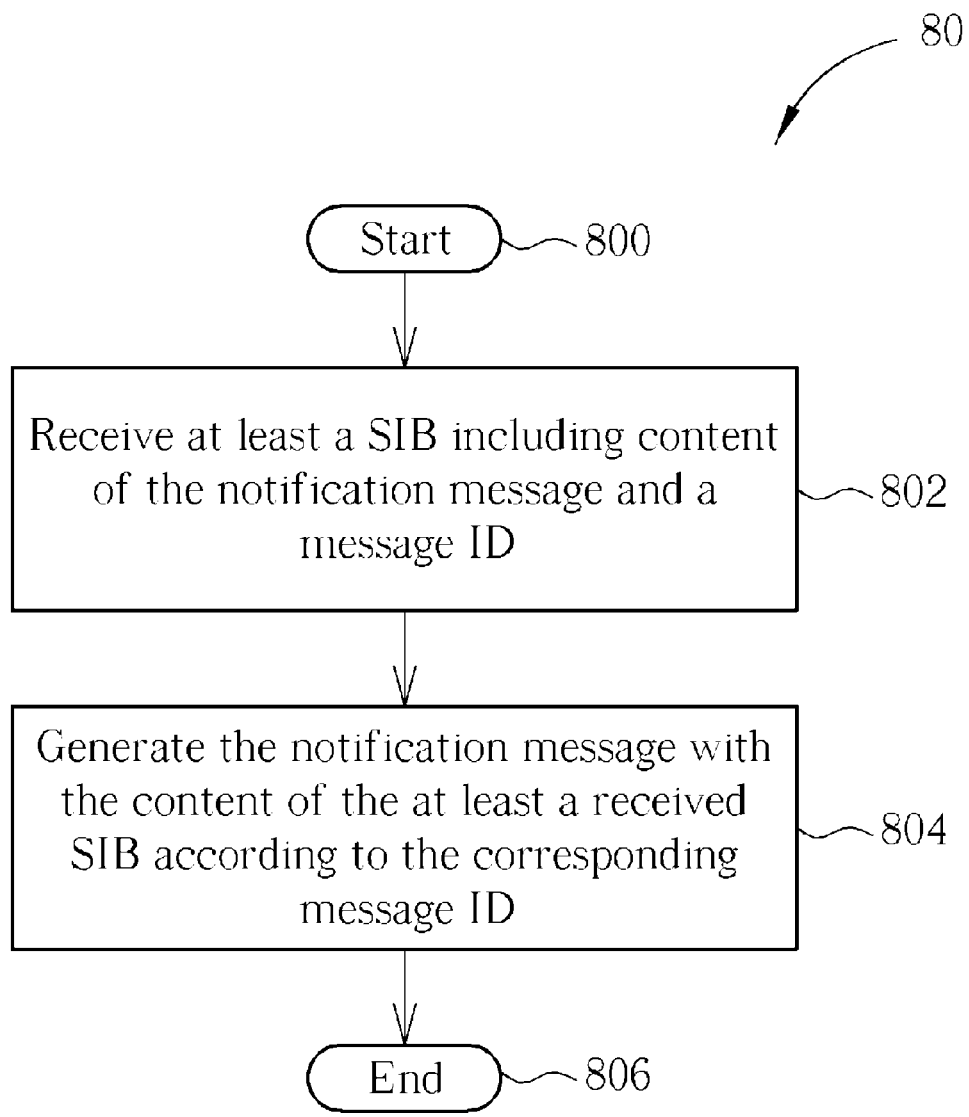

Please refer to FIGS. 7 and 8, which illustrate flowcharts of processes 70 and 80 according to an embodiment of the present invention. The processes 70 and 80 are utilized for handling a content change of a notification message corresponding to ETWS for a network and an ETWS capable UE of a wireless communication system, respectively. The processes 70 and 80 can be compiled into the program code 214 of the process in the storage data 212. The process 70 includes the following steps:

Step 700: Start.

Step 702: Include a message identity (ID) in a SIB including content of the notification message.

Step 704: End.

According to the process 70, the network includes a message identity (ID) in each SIB. The message ID is used for notifying the UE which notification message the current notification message content belongs to. The network segments the notification message to send the segment content via multiple SIBs, or send a complete notification message via an SIB without segmenting.

In addition, the process 80 includes the following steps:

Step 800: Start.

Step 802: Receive at least a SIB including content of the notification message and a message ID.

Step 804: Generate the notification message with the content of the at least a received SIB according to the corresponding message ID.

Step 806: End.

According to the process 80, the UE receives the SIB/SIBs to acquire segment content or complete content of the notification message. Then, the UE generates the notification message with the content of the received SIB/SIBs according to the corresponding message ID/IDs.

When the notification message is sent with segments, the UE can find multiple same message IDs in the received SIBs and thereby combines the corresponding content to generate a complete notification message. When the notification message is sent without segmenting, the UE only finds a unique message ID different from the preceding one and the subsequent one. This means that the content with the unique message ID is the content of a complete notification message.

In the processes 70 and 80, when the notification message is a secondary notification message, the SIB is SIB11. When the notification message is a primary notification message, the SIB is SIB10.

Alternatively, the message ID can be included in the content of the notification message. In this situation, when reading the currently received content, the UE knows which notification message the content belongs to.

Thus, with introduction of the message ID, the UE is able to distinguish the received notification messages to ensure the decoded content is correct. In addition, duplicate content can be detected.

Another usage of the message ID is that the UE determines whether the message content changes according to a change of the message ID.

Figure 12:
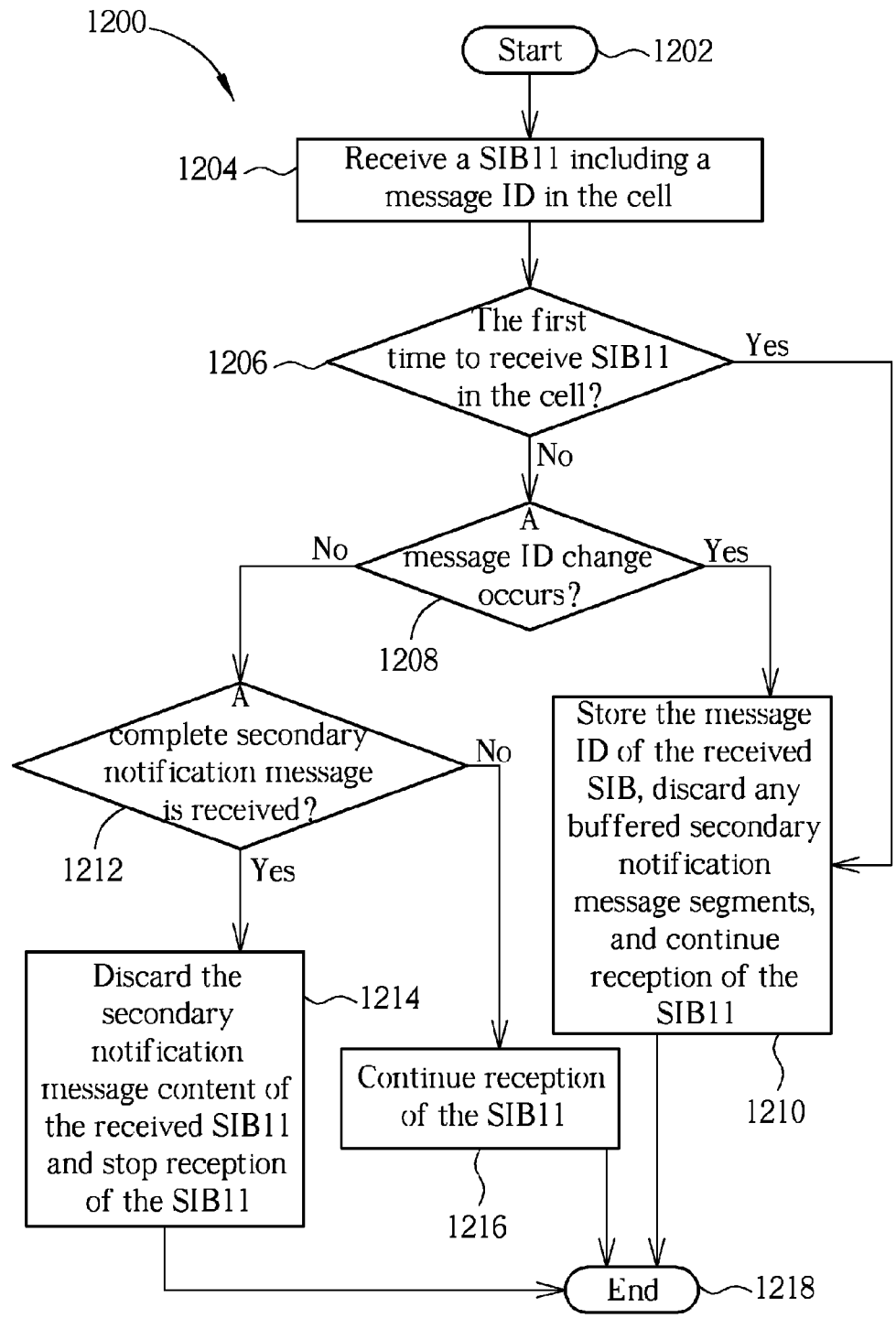

Take a message ID sent via SIB11 for the secondary notification message for example. When the UE receives an SIB 11, the UE compares the message ID in the received SIB11 with a message ID previously stored in the UE. Please refer to FIG. 12, which illustrate flowcharts of a process 1200 according to an embodiment of the present invention. The process 1200 is utilized for handling a content change of a notification message corresponding to ETWS for an ETWS capable UE including a stored message ID. The 1200 can be compiled into the program code 214 of the process in the storage data 212. The process 1200 includes the following steps:

Step 1202: Start.

Step 1204: Receive a SIB11 including a message ID in the cell.

Step 1206: Determine whether the reception is the first time to receive SIB11 in the cell? If so, perform Step 1210; if not, perform Step 1208.

Step 1208: Compare the received message ID with the stored message ID to determine whether a message ID change occurs? If so, perform Step 1210; if not, perform Step 1212.

Step 1210: Store the message ID of the received SIB, discard any buffered secondary notification message segments, continue reception of the SIB11, and then perform Step 1218.

Step 1212: Determine whether a complete secondary notification message is received? If so, perform Step 1214; if not, perform Step 1212.

Step 1214: Discard the secondary notification message content of the received SIB11, stop reception of the SIB11 and then perform Step 1218.

Step 1216: Continue reception of the SIB11.

Step 1218: End.

According to the process 1200, the UE receives the SIB11 and determines whether the receipt of the SIB11 is the first time in the cell or not. When the UE first time receives the SIB11 in the cell, the UE stores the message ID of the received SIB, discards any buffered secondary notification message segment and continues reception of the SIB11. When the receipt is not the first time, the UE compares the received message ID with the previously stored message ID to determine a message ID change occurs. The UE stores the message ID, discards the secondary notification message content of the received SIB11 and further stops reception of the SIB when the received message ID is unchanged compared with the stored message ID, indicating a message ID change occurs. Otherwise, the UE turns to determine whether a complete secondary notification message is received. That is, the UE determines whether all message ID belonging to the complete secondary notification message is received. The UE discards the currently-received secondary notification message content and stops the reception of the SIB11; otherwise the UE continues reception of the SIB.

Through the process 1200, the UE is able to discard any buffered secondary notification message segment and continue reception of the SIB11 when the UE first time receives the SIB11 in a cell. Therefore, the UE can avoid missing the new second notification message broadcasted by a new cell to which the UE reselects or selects.

On the other hand, the UE clears the stored message ID when the UE reselects or selects to another cell. The clearing of the stored message ID can be achieved by setting the stored message ID to a value that is not within a predetermined value range. For example, if the predetermined value range is 0 to 2, the UE can set the stored message ID to 3 for message ID clearing. Furthermore, the UE discards segments of the secondary notification message buffered in the UE when reselecting or selecting to another cell.

The cause for the UE to reselect or select to another cell can be cell reselection, a handover or a radio resource control connection re-establishment.

Figure 9:
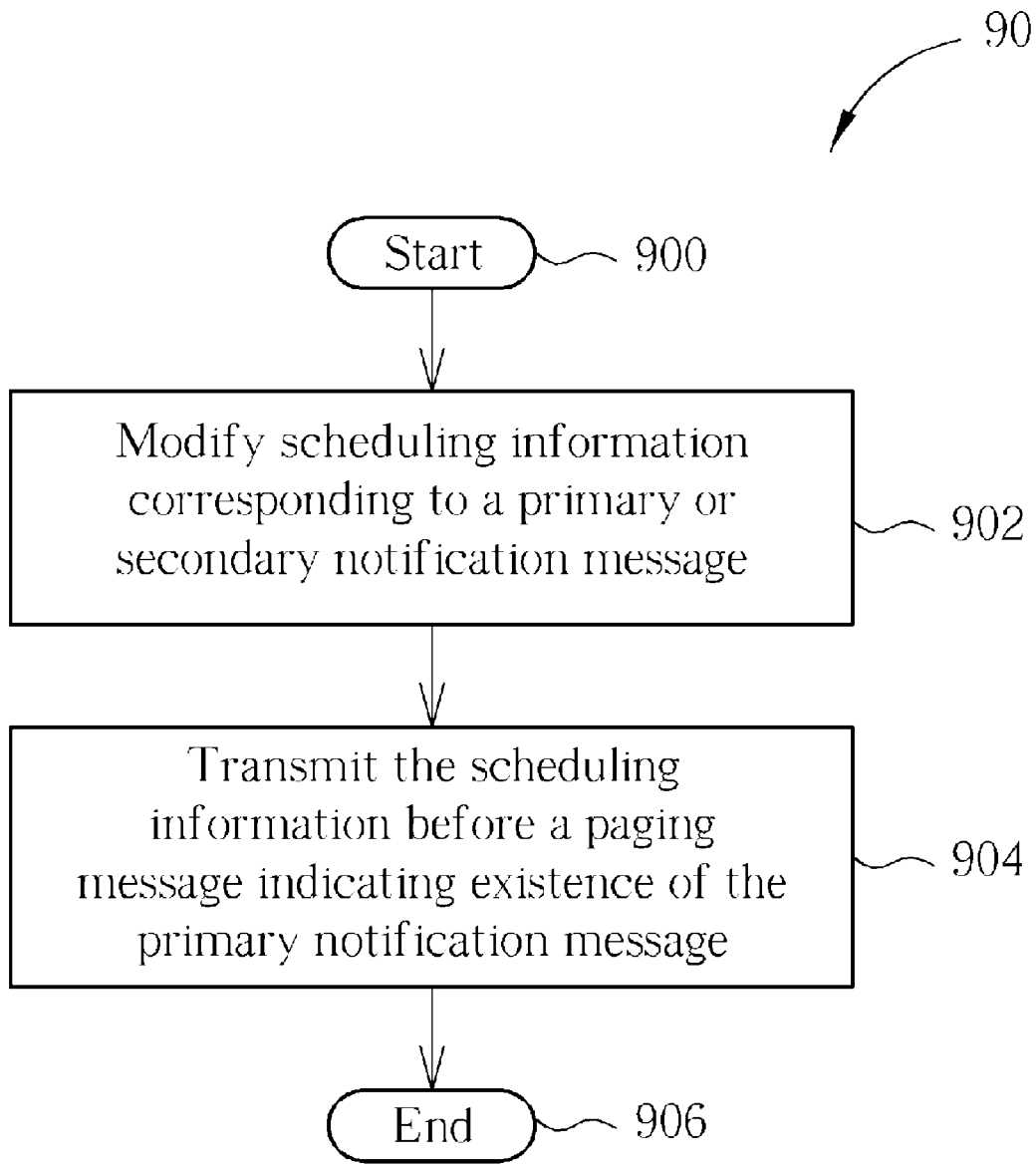

Please refer to FIG. 9, which illustrates a flowchart of a process 90 according to an embodiment of the present invention. The processes 90 is utilized for transmitting a notification message corresponding to ETWS for a network of a wireless communication system and can be compiled into the program code 214 of the process in the storage data 212. The process 90 includes the following steps:

Step 900: Start.

Step 902: Modify scheduling information corresponding to a primary or secondary notification message.

Step 904: Transmit the scheduling information before a paging message indicating existence of the primary notification message.

Step 906: End.

According to the process 90, the network modifies scheduling information corresponding to the primary or secondary notification message and transmits the modified scheduling information before the paging message to ensure that the UE can receive the primary notification message and the secondary notification message.

Take the primary notification message sent via the SIB10 and the secondary notification message sent via the SIB11 for example. The scheduling information is sent via the SIB1. The paging message indicating existence of the primary notification message is a paging message including an "etws-PrimaryNotificationindication" for indicating changes of the SIB1. In this situation, the UE is certainly able to find the SIB1 changes after receiving the paging message.

Figure 10:
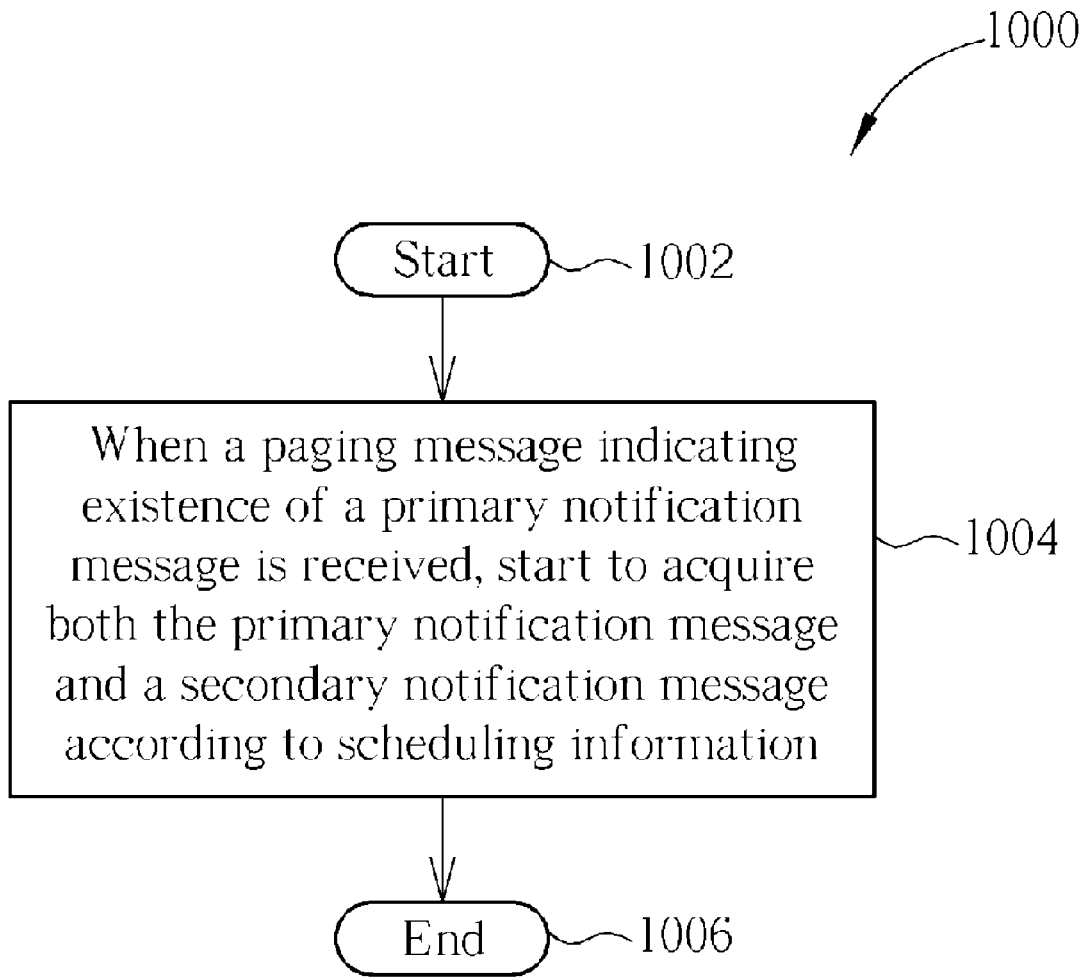

Please refer to FIG. 10, which illustrates flowcharts of a process 1000 according to an embodiment of the present invention. The process 1000 is utilized for receiving a notification message corresponding to ETWS for a UE of a wireless communication system and can be compiled into the program code 214 of the process in the storage data 212. The process 1000 includes the following steps:

Step 1002: Start.

Step 1004: When a paging message indicating existence of a primary notification message is received, start to acquire both the primary notification message and a secondary notification message according to scheduling information.

Step 1006: End.

According to the process 1000, the UE starts to acquire both the primary and secondary notification messages according to the scheduling information when receiving the paging message.

Preferably, the scheduling information for the primary and secondary notification messages is received from the SIB1. The paging message indicating existence of a primary notification message is a paging message including "etws-PrimaryNotificationindication".

In the prior art, the UE only starts to acquire the primary notification message when receiving the paging message including "etws-PrimaryNotificationindication", resulting in poor receiving efficiency of the secondary notification messages. Compared to the prior art, the UE using the process 1000 starts to acquire both the primary and secondary notification messages to allow the secondary notification messages to be received as soon as possible.

Preferably, the UE starts to acquire the secondary notification message in a known delay after the UE knows the start time of the secondary notification message transmission.

Take a system information broadcast providing modification periods for example. According to the scheduling information, the UE starts to acquire the secondary notification message at the beginning boundary of a modification period next to the modification period where the UE receives the paging message indicating the SIB1 change.

Figure 11:
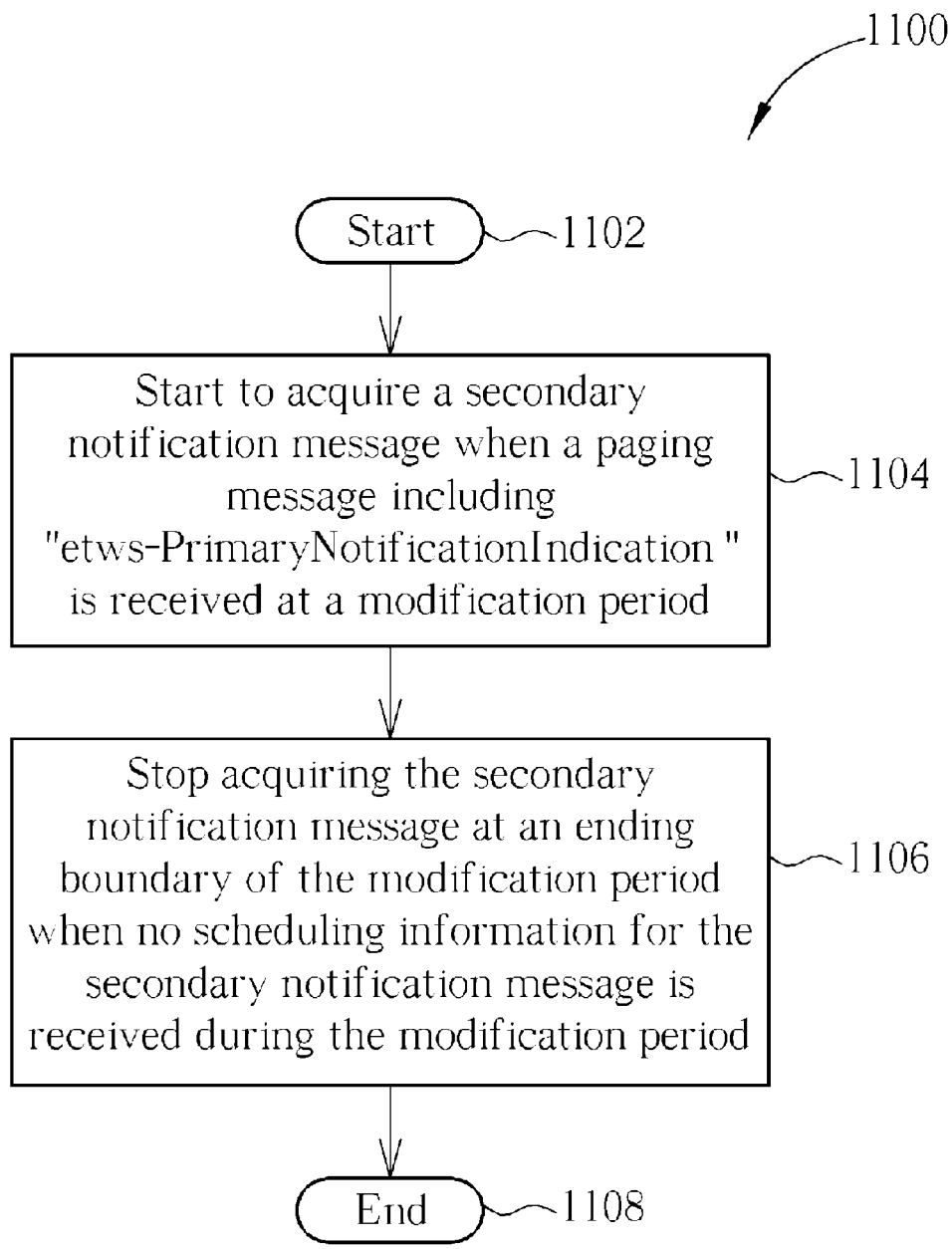

Please refer to FIG. 11, which illustrates a flowchart of a process 1100 according to an embodiment of the present invention. The processes 1100 is utilized for receiving a notification message corresponding to ETWS for a UE of a wireless communication system and can be compiled into the program code 214 of the process in the storage data 212. The process 1100 includes the following steps:

Step 1102: Start.

Step 1104: Start to acquire a secondary notification message when a paging message including "etws-PrimaryNotificationindication" is received at a modification period.

Step 1106: Stop acquiring the secondary notification message at an ending boundary of the modification period when no scheduling information for the secondary notification message is received during the modification period.

Step 1108: End.

According to the process 1100, at the modification period where the paging message including "etws-PrimaryNotificationindication" is received, the UE starts to acquire the secondary notification message. At the ending boundary of the modification period, the UE stops acquiring the secondary notification message when no scheduling information for the secondary notification message is received during the modification period. In other words, the UE does not continue acquiring the secondary notification message from the next modification period.

Through the process 1100, the UE can detect whether any secondary notification message is broadcasted. If no scheduling information for secondary notification is published, the UE can save power on reception of the secondary notification message.

In conclusion, the embodiments of the present inventions handle the notification message reception and transmission corresponding to message content changes and receiving targets.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling notification message transmission for a network of a wireless natural disaster warning communication system, the method comprising:

when content of a notification message comprising a message identity is changed, modifying the message identity, wherein the message identity is included in a system information block, hereinafter called SIB, and indicates which notification message a notification message content in the SIB belongs to; and sending the SIB and a paging message comprising at least one of a flag and an element, wherein the flag is used to notify a user equipment of a change of the SIB, and the element is an Earthquake and Tsunami Warning System (ETWS) secondary notification indication when the notification message is a secondary notification message; and the element is an ETWS primary notification indication when the notification message is a primary notification message;

wherein the element is used for the user equipment to acquire the SIB when the element is found in the received paging message.

2. The method of claim 1, wherein the notification message is a primary notification message or a secondary notification message.

3. The method of claim 2, wherein the primary notification message is transmitted via an SIB10 or the secondary notification message is transmitted via an SIB11.

4. A method of handling notification message reception for a user equipment of a wireless natural disaster warning communication system, the method comprising:
   receiving a paging message comprising at least one of a flag and an element, wherein the flag is used to notify the user equipment of a change of a system information block (SIB) comprising content of a notification message, and the element is an Earthquake and Tsunami Warning System (ETWS) secondary notification indication when the notification message is a secondary notification message; and the element is an ETWS primary notification indication when the notification message is a primary notification message;
   acquiring the SIB when the element is found in the received paging message;
   receiving message identity corresponding to the notification message transmission, wherein the message identity is included in the SIB and indicates which notification message the notification message content in the SIB belongs to; and
   discarding any buffered notification message content in a buffer of the user equipment when the message identity is different from a previously received message identity.

5. The method of claim 4, wherein the notification message is a primary notification message or a secondary notification message.

6. The method of claim 5, wherein the primary notification message is transmitted via an SIB10 or the secondary notification message is transmitted via an SIB11.

7. A method of handling notification message reception for a user equipment of a wireless natural disaster warning communication system, the method comprising: receiving a paging message comprising at least one of a flag and an element, wherein the flag is used to notify the user equipment of a change of a system information block (SIB) comprising content of a notification message, and the element is an Earthquake and Tsunami Warning System (ETWS) secondary notification indication when the notification message is a secondary notification message; and the element is an ETWS primary notification indication when the notification message is a primary notification message; and
   acquiring the SIB and discarding any buffered notification message content in a buffer of the user equipment when the element is found in the received paging message.

8. A method of handling notification message transmission for a network of a wireless natural disaster warning communication system, the method comprising:
   including a message identity in each of a plurality of system information blocks, hereinafter called SIBs, wherein each SIB comprises a segment of content of a same notification message, wherein the message identity is used to notify which notification message each SIB belongs to; and
   sending the SIB and a paging message comprising at least one of a flag and an element, wherein the flag is used to notify a user equipment of a change of the SIB, and the element is an Earthquake and Tsunami Warning System (ETWS) secondary notification indication when the notification message is a secondary notification message; and the element is an ETWS primary notification indication when the notification message is a primary notification message;
   wherein the element is used for the user equipment to acquire the SIB when the element is found in the received paging message.

9. The method of claim 8, wherein the notification message is a primary notification message or a secondary notification message.

10. The method of claim 9, wherein the SIB is an SIB 10 when the notification message is the primary notification message; and the SIB is an SIB 11 when the notification message is the secondary notification message.

11. The method of claim 8, wherein the content of a notification message is complete content of the notification message or partial content of the notification message.

12. A method of handling notification message reception for a user equipment of a wireless natural disaster warning communication system, the method comprising:
   receiving a paging message comprising at least one of a flag and an element, wherein the flag is used to notify the user equipment of a change of a system information block (SIB) comprising content of a notification message and a message identity, and the element is an Earthquake and Tsunami Warning System (ETWS) secondary notification indication when the notification message is a secondary notification message; and the element is an ETWS primary notification indication when the notification message is a primary notification message;
   receiving the SIB when the element is found in the received paging message; and
   generating the notification message with the received SIB, wherein the message identity is used to notify the user equipment which notification message the SIB belongs to.

13. The method of claim 12, wherein the notification message is a primary notification message or a secondary notification message.

14. The method of claim 13, wherein the SIB is an SIB 10 when the notification message is the primary notification message, and he SIB is an SIB 11 when the notification message is the secondary notification message.

15. The method of claim 12, wherein generating the notification message with the content of the at least a received SIB according to the corresponding message identity comprises generating a complete notification message with the content of a plurality of received SIBs according to the corresponding message identity when the content of the notification message included in each of the plurality of received SIBs is partial content of the notification message.

16. The method of claim 12, wherein generating the notification message with the content of the at least a received SIB according to the corresponding message identity comprises generating a complete notification message with the content of a received SIB according to the message identity when the content of the notification message included in the received SIB is complete content of the notification message.

17. The method of claim 12 further comprising upon receiving the SIB in a first cell, discarding the content of the notification message of the SIB and stopping reception of the SIB when the message identity is unchanged compared with the previously stored message identity and content of a complete notification message is received.

18. The method of claim 12 further comprising upon receiving the SIB in a first cell, storing the message identity of the received SIB and continuing reception of the SIB when the message identity is changed compared with the previously stored message identity or when the SIB is received first time in the first cell.

19. The method of claim 18 further comprising discarding the notification message buffered in the user equipment.

20. The method of claim 18 further comprising clearing the stored message identity when the user equipment reselects or selects to a second cell.

21. The method of claim 20, wherein clearing the stored message identity when the user equipment reselects or selects to the second cell comprises setting the stored message identity to a value that is not in a predetermined value range of the message identity when the user equipment reselects or selects to the second cell.

22. The method of claim 11 further comprising discarding segments of the notification message buffered in the user equipment when the user equipment reselects or selects to a second cell.

23. The method of claim 22, wherein the user equipment reselects or selects to a second cell due to cell reselection, handover or a radio resource control connection re-establishment.

\* \* \* \* \*